Sept. 4, 1956 F. A. KROHM 2,761,429
FLUID MOTOR CONTROL
Filed Aug. 9, 1955 3 Sheets-Sheet 1
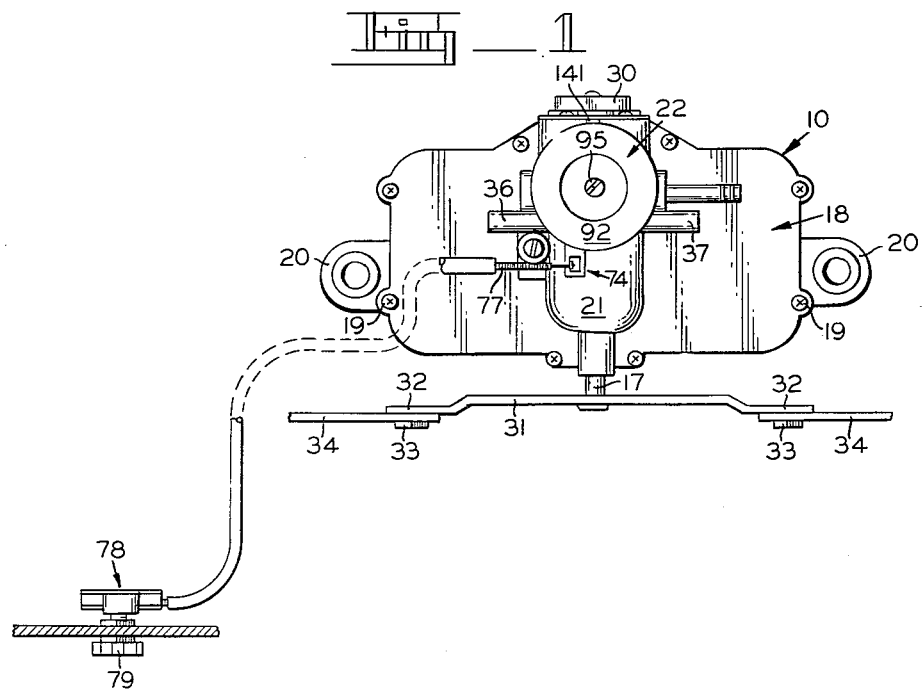
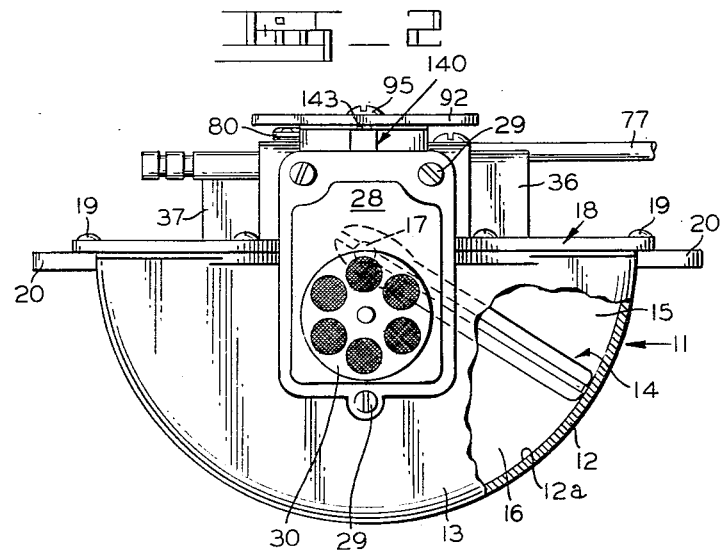
INVENTOR.
FRED A. KROHM
BY H.P. Settle, Jr.
ATTORNEY

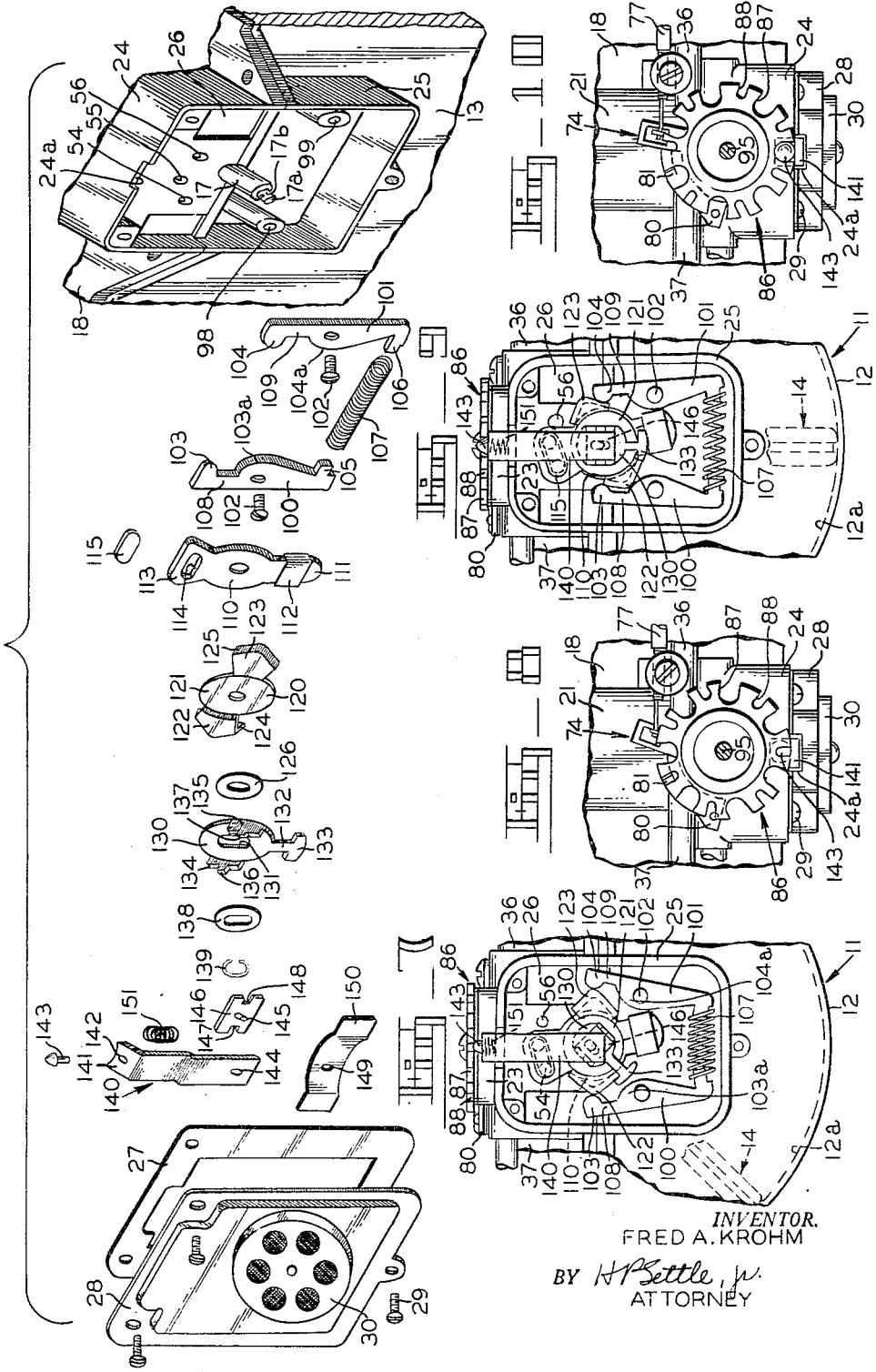

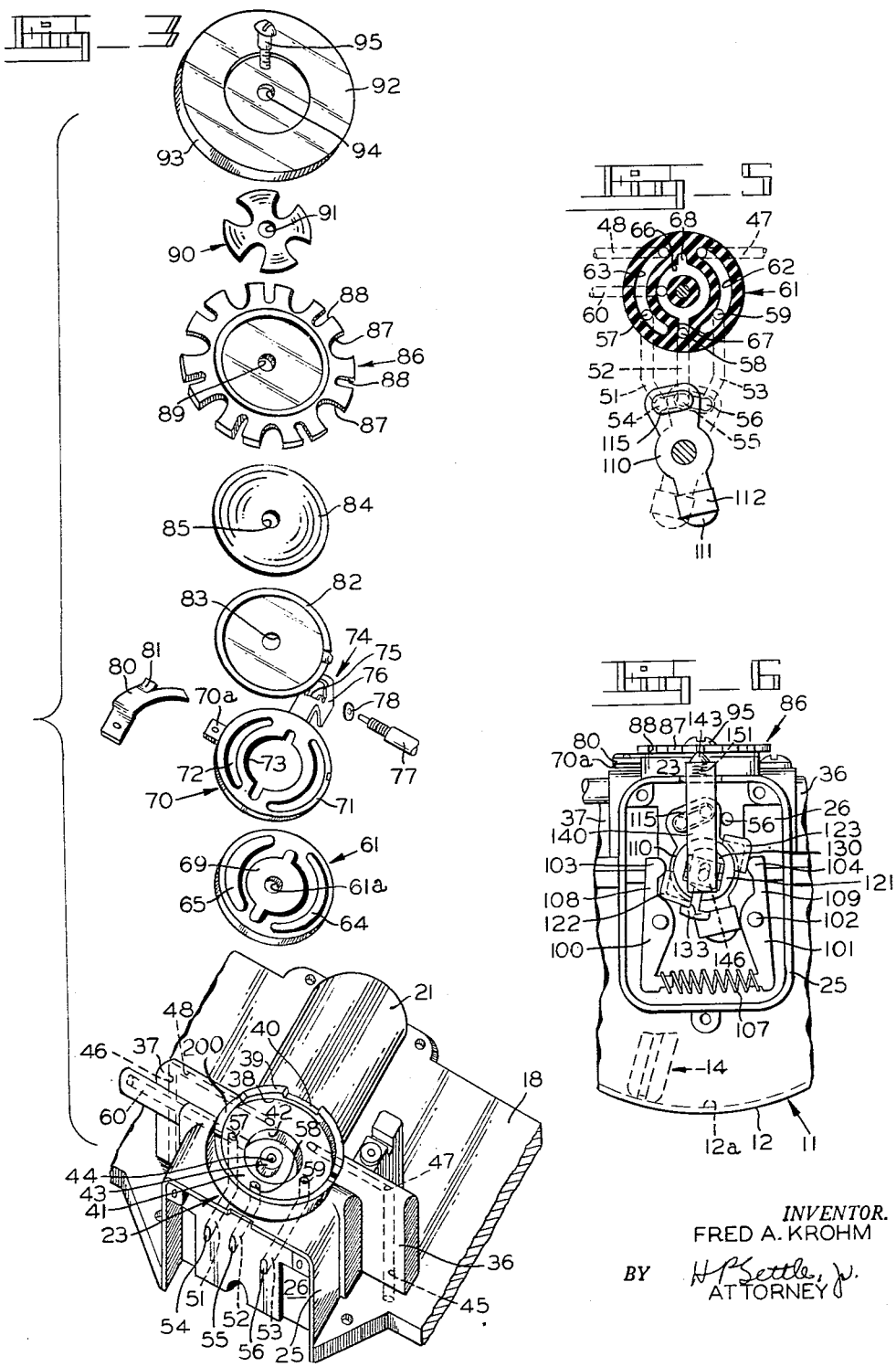

United States Patent Office 2,761,429
Patented Sept. 4, 1956

2,761,429

FLUID MOTOR CONTROL

Fred A. Krohm, Hobart, Ind., assignor to Productive Inventions, Inc., a corporation of Indiana Application August 9, 1955, Serial No. 527,275

13 Claims. (Cl. 121—97)

The present invention relates to a fluid motor control and more particularly to a control for a fluid motor, such as a windshield wiper motor, in which a manual control is provided to vary the stroke and/or the frequency of motor operation.

In the development of automotive windshield wiper systems, for use with automobiles, trucks, or the like vehicles, the most common system utilizes a fluid motor, usually a vacuum motor which is driven by engine intake manifold vacuum. However, such systems do suffer from the defect that the conventional motor operates at a constant stroke and variations in engine intake manifold vacuum, which of course varies with varying engine operating conditions, must cause less frequent wiping action since a lower degree of vacuum necessarily requires a greater time to move the wiper through a full stroke. These variations of the frequency of the stroke may become an actual safety hazard under some conditions, such as in a sudden torrential rain, at which the motor cannot operate at a frequency rapid enough to clear the windshield for good visibility.

The present invention now provides a new, novel, and improved fluid motor control particularly adapted for use with a windshield wiper motor of the vacuum type in which the stroke and/or the frequency of the stroke may be varied under driver control. The control of the motor is accomplished through the use of a conventional manual control which operates the primary valve for venting the motor to engine vacuum or to vacuum from a booster pump. The motions of the driver in controlling the device of the present invention are the same as in controlling a conventional wiper system, inasmuch as only a single manual control is provided which is operated merely to shut off and turn on the wiper motor. Alternate energization of the motor will cause the motor to operate at different frequencies and different strokes, so that, if the motor is not operating for the greatest efficiency under the driving conditions at any time, the driver merely needs to turn off the motor and turn the motor on again to arrive at the desired motor operating conditions of frequency and stroke.

The mechanism which is utilized to accomplish this simplified control for the wiper fluid motor operates by varying the point of actuation of the secondary or shuttle valve mechanism of the motor which alternately vents the opposite side of the motor piston or vane to vacuum or any other source of fluid at a pressure different from atmospheric pressure or at a pressure higher than a pressure at which such fluid is discharged from the motor. The shuttle or secondardy valve is operatively connected to the piston or vane of the fluid motor, so that the piston or vane, as it approaches the end of its stroke, effects operation of the shuttle valve with a "snap" action to vent the other side of the piston to the source of fluid pressure. In this manner, the piston or vane is reciprocated within the motor to energize the wiper system linkage.

The present invention provides means for actuating the shuttle valve at varying positions of the motor piston or vane, so that a longer or shorter stroke of the piston or vane is required to actuate the shuttle valve for reciprocating the piston or vane. At the same time, shortening the stroke of the vane increases the frequency of reciprocation of the vane, so that the wiping elements or blades of the wiping system are moved more rapidly, but through a shorter distance. Thus, the area immediately in front of the driver, and through which road visibility is necessary, is wiped more frequently.

It is, therefore, an important object of the present invention to provide a new and improved windshield wiper system utilizing a fluid motor in which the stroke and/or frequency of the motor operation may be varied manually by the driver of a vehicle equipped with the system.

Another important object of the present invention is the provision of an improved control for a fluid motor, wherein the stroke of the displaceable element of the motor is varied by changing the point of actuation of a shuttle valve with respect to movement of the displaceable element.

It is a further object to provide an improved control for a windshield wiper fluid motor wherein the relationship between vane movement and shuttle valve actuation may be varied upon successive actuations of the primary valve to vary the stroke and/or operating frequency of the motor.

Yet another important object is the provision of an improved windshield wiper fluid motor wherein a single manual control is effective to operate a primary valve and also to operate a shuttle valve actuating mechanism to vary the frequency of operation of the shuttle valve, thereby varying the frequency of reciprocation of the motor.

Yet another object of the present invention is the provision of a control for a fluid motor wherein the motor piston is reciprocated by the successive subjection of opposite sides of the piston to fluid at a pressure different from atmospheric pressure, the fluid being supplied to the motor through a primary valve and a secondary valve effective to vent fluid to either side of the piston, successive operations of the primary valve affecting the frequency of operation of the secondary valve to thereby vary the stroke and/or frequency of piston actuation.

Other and further important objects of the present invention will become apparent from a study of the detailed description of the invention as hereinafter set forth and an inspection of the appended drawings.

On the drawings:

Figure 1 is a plan view of a fluid motor provided with a control of the present invention and illustrated as forming a part of a windshield wiper system including a linkage leading to the wiper pivot shaft;

Figure 2 is a front elevational view of the motor illustrated in Figure 1;

Figure 3 is an exploded perspective view illustrating the motor and the primary valve assembly therefor, including a portion of the control of the present invention;

Figure 4 is an exploded perspective view illustrating the shuttle valve assembly for the motor illustrated in Figures 1 and 2 and illustrating the remainder of the control system of the present invention;

Figure 5 is a fragmentary, somewhat schematic view illustrating the primary valve and shuttle valve combination, indicating the coordination between these valves;

Figure 6 is a fragmentary front view of the motor of Figures 1 and 2, with the shuttle valve cover plate removed to illustrate the operation of the control system of the present invention when the motor operates at its normal or long stroke, the shuttle valve actuating mechanism being illustrated at the point of initiation of actuation;

Figure 7 is a view similar to Figure 6 showing the shuttle valve actuating mechanism in an adjusted position at which the shuttle valve is partially actuated;

Figure 8 is a fragmentary plan view illustrating the condition of the primary valve actuating mechanism when the shuttle valve actuating mechanism is in its position of Figures 6 and 7;

Figure 9 is a view similar to Figures 6 and 7 showing the shuttle valve actuating mechanism at the initiation of actuation, the shuttle valve being conditioned for its short stroke; and Figure 10 is a fragmentary plan view similar to Figure 8 showing the condition of the primary valve actuating means when the shuttle valve actuating means is in its condition in Figure 9.

As shown on the drawings:

In Figure 1, reference numeral 10 refers generally to a fluid motor. The illustrated motor is of the swinging-vane type commonly utilized for the actuation of a windshield wiper system, although it will be appreciated that the principles of control of the motor forming a part of this invention are applicable to many different types of motors.

The motor 10 comprises a main casing section indicated generally at 11 and defining a lower arcuate wall 12 closed by a front wall 13 and a rear wall. The interior surface 12a of the arcuate bottom wall 12 is likewise arcuate in configuration and defines an interior space which is subdivided by an oscillating piston or vane, indicated generally at 14, into a pair of spaces or compartments 15 and 16. The compartments 15 and 16 are of varying size as the vane 14 oscillates about its shaft 17 which is confined between the lower motor casing 11 and an upper casing wall or cover plate indicated generally at 18 which is secured to the lower casing section by a suitable means, as by screws 19. The lower casing carries laterally extending attachment ears 20 adapted for securing the motor in position on a vehicular component.

The cover plate 18 is provided with a longitudinally extending, generally semi-cylindrical embossment 21 which is co-axial with the shaft 17 and which is surmounted by a primary valve assembly 22 to be hereinafter more fully described, and which is mounted upon a generally circular boss 23 formed integrally with the embossment 21 and with the cover plate, as best seen in Figure 3. The forward end of the embossment 21 terminates in an open-bottomed housing section 24 which cooperates with a generally similar, open-topped housing section 25 formed in the main casing 11. These two casing sections 24 and 25 cooperate to enclose a generally rectangular interior space 26 for the reception of a shuttle valve assembly illustrated in Figure 4, the space 26 being closed by a gasket 27 (Figure 4) preferably formed of cork or the like, and a cover plate 28 secured to the casing sections 24 and 25 by suitable means, as by screws 29 which are received by bosses 29a formed integrally with the top and bottom casing sections. The cover plate 28 carries fixed thereto an air filter 30 for admitting only filtered air to the interior space 26 defined by the casing sections 24 and 25.

The piston or vane shaft 17 projects rearwardly beyond the confines of the cover plate 18 and the lower casing section 11 and carries thereon fixed thereto an actuating arm 31 having its extreme ends 32 pivotally connected, as at 33, to actuating links 34 forming a part of the windshield wiper actuating mechanism. The actuating mechanism forms no part of the present invention, and may be any of the types of linkage or cable drive systems which are conventionally employed in windshield wiper systems.

As best illustrated in Figure 3, the cover plate is provided with laterally extending shoulders 36 and 37 which are laterally aligned with the embossment 23. As illustrated in Figure 3, the embossment 23 is provided with an upper, open-topped recess 38 defining a free upper annular shoulder 39 which is notched, as at 40 and which surrounds an annular valve seat 41. Located centrally of the annular valve seat 41 is a second recess 42 which surrounds a central boss 43 provided with a centrally located threaded vertical aperture 44.

The shoulders 36 and 37 are each provided with vertical passages 45 and 46, respectively, which communicate with respective lateral passages 47, 48 which in turn communicate with the annular valve seat 41. Communication is thus established between the annular valve seat 41 and each of the compartments 15 and 16 defined in the interior of the lower casing section by the swingable vane 14. Communication to the compartment 15 is provided through the passages 45 and 47 in the shoulder 36, while communication with the compartment 16 is provided through the passages 46 and 48 in the shoulder 37.

Communication through the compartment 26 defined at the front of the motor by the casing sections 24 and 25 is provided by a series of passages 51, 52, and 53 which establish communication between ports 54, 55, and 56 in the compartment 26 and ports 57, 58, and 59 arranged peripherally on the annular valve seat 41. It will be noted that the ports 54, 55, and 56 are arranged arcuately about the axis of the shaft 17, while the ports 57, 58, and 59 are peripherally spaced from each other and from the ports which communicate with the passages 47 and 48 on the annular valve seat 41.

A source of pressure differing from atmospheric pressure, preferably intake manifold vacuum in the case of an automotive windshield wiper motor, is vented to the central recess 42 of the embossment 23 through a lateral passage 60. Thus, when the passage 60 is connected to the source of pressure different from atmospheric pressure, the central recess 42 of the boss 23 is subjected to vacuum or other source pressure, and by connecting the central recess 42 to either of the passages 47 or 48, this source pressure can be vented to the compartments 15 and 16, respectively, of the motor so as to move the vane 14, providing the other side of the vane is vented to a different pressure, such as atmospheric pressure.

The proper venting of the compartments 15 and 16 to air and to vacuum is accomplished through the use of a pair of cooperating valves. One of these valves, denoted as the primary valve assembly, is illustrated in Figure 3 of the drawings. This valve assembly includes the primary valve proper, which is indicated by reference numeral 61 in Figures 3 and 5. This valve 61 comprises a circular disc, preferably formed of rubber, and having a pair of closed arcuate passages 62 and 63 therein of an arcuate extent sufficient to connect, through passage 62, the port 59 and the passage 47, while the passage 63 is of an extent sufficient to interconnect the port 57 and the passage 48. This interconnection of these passages is indicated in Figure 5 of the drawings. To provide the arcuate passages 62 and 63, the rubber primary valve 61 is provided with arcuate embossments 64 and 65 (Figure 3). The valve 61 also is provided with a central annular passage 66 which is provided with a pair of radial extensions 67 and 68 which serve, when the valve is positioned as illustrated in Figure 5, to interconnect the port 58 of the passage 62 and the vacuum supply line 60.

It will be appreciated that in Figure 5, the primary valve is moved to its "on" position, as contrasted with its "off" position at which the port 59 and line 47 are disconnected, the port 57 and the line 48 remain connected, and the vacuum line 60 is connected directly to the port 47. This condition occurs upon clockwise movement of the valve 61 from its position shown in Figure 5 and results in the continuous application of vacuum to the line 47 and the maintenance of the vane or piston 14 in its position at which the compartment 15 is of minimum dimension and the wiper is parked.

The valve proper 61 is provided with a central, generally annular embossment 69 which accommodates the provision of the annular recess 66 of the under-surface thereof.

To actuate the primary valve proper 61, there is provided a primary valve plate indicated generally at 70 (Figure 3) which is provided with a pair of arcuate slots 71 and 72 receiving the arcuate embossments 64 and 65, respectively, and a central generally annular opening 73 receiving the central embossment 69. When the primary valve plate is telescoped over the primary valve proper 61, it will be seen that the cooperation of the embossments 64, 65, and 69 with the apertures 71, 72, and 73 will hold the primary valve plate and the primary valve in co-rotative relationship.

The primary valve plate is provided with a radially extending fixed arm 74 movable in the notch 40 provided in the annular shoulder 39 surrounding the valve seat 41. This arm is provided with a key-hole slot 75 and a depending flange 76, the slot being adapted to receive the terminal end of an actuating member, such as a Bowden cable 77 which carries at its end a locking washer 78 inserted in the key-hole aperture 75. The Bowden cable 77 is illustrated in Figure 1 as being connected to a manual actuating mechanism including a rack and pinion enclosed within a casing 78. This manual actuating mechanism housed in the casing 78 is of the conventional type and need not be specifically illustrated, although it includes a rack (not shown) which is secured to the free end of the Bowden cable 77 and a pinion (not shown) mounted in the casing 78 and adapted to be rotated by a manual actuating knob 79. Rotation of the knob will effect reciprocation of the Bowden cable to actuate the primary valve plate 70 for rotative movement, such rotation moving the primary valve proper 61 to its various rotative positions which have been described in connection with Figure 5 of the drawings.

The primary valve plate is provided with a radially extending projection 70a to which is secured a detent plate actuator 80, for a purpose to be hereinafter more fully described, the actuator being riveted or otherwise secured to the projection 70a and being generally arcuate to conform to the outer peripheral contour of the primary valve plate. The projection 70a moves in a notch 200 provided in the annular shoulder 39. The detent plate actuator has an upwardly deflected actuating finger 81 for a purpose which will be hereinafter described in greater detail.

A circular valve bearing 82 is provided to directly overlie the primary valve plate 70, the bearing being provided with a central aperture 83 which registers with the opening 73 of the primary valve plate and the central aperture 61a of the primary valve 61. Superimposed on the valve bearing 82 is a concave or dished-plate spring 84 likewise of circular contour and provided with a central aperture 85. The valve bearing serves to prevent the direct bearing of the dished-plate spring upon the primary valve plate and the primary valve.

Superimposed on the spring plate 84 is a detent plate indicated generally at 86. This detent plate is generally circular in contour and is provided with peripherally spaced notches 87 and 88. It will be noted that the notches 87 are considerably larger in peripheral extent than the notches 88. The notches are arranged uniformly around the exterior periphery of the detent plate in a manner to be hereinafter described and for a purpose which will soon develop. The detent plate is centrally apertured, as at 89, also for registry with the apertures 85, 83, 73, and 61a.

Superimposed upon and bearing directly upon the detent plate is a cruciform spring indicated generally at 90 and centrally apertured as at 91.

Superimposed upon the spring 90 and over the entire primary valve assembly which comprises the primary valve 61, the primary valve plate 70, the valve bearing 82, the plate spring 84, the detent plate 86, and the cruciform spring 90 is a cover plate 92 which is circular in form and which has a depending annular flange 93 which partially surrounds the remainder of the primary valve assembly. This cover plate is centrally apertured, as at 94, and receives therethrough a screw or other attaching means 95 which extends through the registering apertures 94, 91, 89, 85, 83, 73, and 61a into the threaded aperture 44 formed in the central embossment 41 of the large, annular boss 23.

The operation of the primary valve assembly will be described later in greater detail, but it will be appreciated that actuation of the manual knob 79 will cause movement of the actuating arm 74 to turn the primary valve plate 70 which, in turn, will turn the primary valve 61. Movement of the primary valve plate 70 will cause turning movement of the detent plate 86 because of the selective engagement of the detent plate actuator finger 81 in the detent plate peripheral recesses 87 and 88. Due to the up-turned configuration of the detent plate actuator finger 81, reverse movement of the Bowden cable, that is retracting movement, as illustrated in Figure 1, toward the left, will not cause movement of the detent plate, but the detent plate will be moved (in a clockwise direction as illustrated in Figure 3 or in a counterclockwise direction as viewed in Figure 1) upon advancement of the Bowden cable, that is movement toward the right in Figure 1. The spacing of the detent plate notches 87 and 88 is such that the edges which are engaged by the detent plate actuator finger 81, i. e., the clockwise edges of each of the notches as shown in Figure 3, are spaced equidistant, so that the same movement of the Bowden cable will accomplish the same movement of the detent plate upon each actuation of the knob 79.

In Figure 4, there is illustrated a shuttle valve assembly of the present invention which serves to direct the flow of differential fluid pressures through the ports which have been placed in registry by the primary valve assembly, as heretofore described.

In Figure 4, it will be noted that this shuttle valve assembly is mounted in the generally rectangular casing defined by the casing sections 24 and 25 of the cover plate 18 and the lower motor casing 11, respectively, within the space 26 defined by the casing, the three valve ports 54, 55, and 56 are provided by the upper cover plate 18, as heretofore described, and the vane or piston shaft 17 projects into the casing, also as heretofore described. Below, and generally laterally displaced from the axis of the shaft 17, are a pair of generally cylindrical bosses 98 and 99 having axial threaded recesses. Mounted upon the end of these bosses 98, 99 are a pair of rocker arms 100, 101, respectively, which extend generally vertically within the casing and which are secured to the bosses by suitable means, as by screws 102 threaded into the axial recesses of the bosses. The upper ends of the rocker arms are provided with opposed, generally convex cam portions 103, 104, respectively, which are utilized in a manner to be hereinafter described for actuation of the shuttle valve. The lower extremities of the arms 100, 101 are provided with opposing inwardly directed projections 105, 106 which are entered into the opposing axial extremities of the coiled compression spring 107. The compression spring 107 tends to spread the lower ends of the rocker arms so that the cam portions 103, 104 thereof are urged toward one another, i. e., toward the axis of the shaft 17.

Loosely journalled upon the shaft 17 is a shuttle valve actuator 110 which takes the form of a plate having a lower depending tail portion 111 surrounded by a cushioning belt 112, preferably formed of rubber. The actuator 110 is provided with an enlarged, generally wedge-shaped upper portion 113 having a centrally located, generally oval opening 114 within which is seated an oval-shaped shuttle valve 115. The shuttle valve 115 is dished and the concave portion of the valve faces toward and registers with the ports 54, 55, and 56 heretofore described. The shuttle valve is of such length that it can bridge only two of the ports at any given time. The valve thus will serve as it is oscillated upon the shaft 17 to connect the port 55 with the port 54, or alternatively to connect the port 55 with the port 56. In this manner, engine intake vacuum which is vented to the port 55 by the passage 52 through the port 58 registering with the radial portion 67 of the primary valve 61 will be vented to either of the two ports 54, 56 for subsequent transmittal to the motor compartments 15 or 16, respectively, as heretofore described.

Also journalled upon the shaft 17 in axially outward relation with respect to the shuttle valve actuator 110, is a cam 120 which comprises a circular central portion 121, diametrically opposed, radially outwardly directed wings or extensions 122 and 123 which are offset forwardly of portion 121 and terminate in cam projections 124 and 125 which extend axially of the shaft 17 to lie between the cam portions 103, 104 of the rocker arms. It will be noted that the cam portions 103, 104 of the rocker arms overlie radially inwardly directed enlarged portions 103a and 104a, respectively, of the rocker arms and that the portions 103 and 103a cooperate to define a cam notch 108 therebetween while the portions 104 and 104a cooperate to define a cam notch 109 therebetween. The cam projections 124 and 125 cooperate with the rocker arms as shown in Figures 6, 7, and 9 so that one of the radially opposed cam projections 124, 125 is seated in the corresponding one of the cam notches 108, 109 while the other cam projection 124, 125 overlies the associated cam portions 103, 104 of the other rocker arm 100, 101.

A driver 130 is positioned upon the shaft 17 axially outwardly of the cam 120, the driver having an oval opening 131 located centrally thereof which is positioned upon a milled or otherwise reduced portion 17a of the shaft 17, so that the driver is rotatable with the shaft. To accommodate relative movement between the driver 130 and the cam 120, an annular washer 126 is interposed therebetween. The oval opening 131 in the driver is of an axial extent greater than the diameter of the shaft 17 so that the driver is free to move radially of the shaft for a reason to be hereinafter more fully described.

The driver is provided with a radial projection which takes the form of a radially extending portion 132 which terminates in an arcuate extension 133 of greater peripheral length than the extension 132. The driver also is provided with a pair of flanges 134 and 135 which extend normal to the plane of the driver and axially of the shaft 17. These flanges 134 and 135 terminate in reduced axial extensions 136 and 137. A second washer 138 is positioned upon the shaft on the reduced portion 17a thereof, the washer having an oval aperture therein conforming to the shape of the aperture 131 of the driver 130. A snap-ring 139 is provided to fit within a groove 17b formed in the shaft 17 to retain the washer 138, the driver 130, the washer 126, the cam 120, and the shuttle valve actuator 110 upon the shaft 17.

It will be noted from Figure 4 that the casing section 24 is provided at its upper edge with a notch 24a located centrally of the upper wall of the casing. Extending through this notch and retained therein for vertical sliding movement by the cover plate 28 is a detent arm 140. This detent arm 140 is provided with an upper terminal flange 141 which overlies the upper wall of the casing section 24 and which is provided with an opening 142 for retaining therein a detent plug 143 which is staked or otherwise secured in the aperture 141 for cooperation with the detent plate 86 heretofore described. The detent arm depends vertically between the cover plate 28 and that portion of the motor cover plate 18 defining the upper casing section 24, into the chamber 26. The lower end of the detent arm is apertured, as at 144, to receive therethrough a pivot pin 145 which is mounted upon and forms a part of a driver adjustment plate 146 which is provided with opposing, inwardly extending slots 147 and 148 within which are seated the projections 136 and 137 formed on the driver flanges 135 and 135, respectively. The pin 145 projects completely through the lower end of the detent arm 140 and into an aperture 149 which is formed centrally of a bowed spring 150 which is urged against the detent arm by its contact with the interior surface of the cover plate 28 and which serves to retain the detent arm and the driver adjustment plate in assembled relation with the projections of the driver seated in the driver adjustment plate recesses 147 and 148.

As best seen in Figures 6 through 10 of the drawings, the detent 143 cooperates with the peripheral recesses 87 and 88 formed in the detent plate 86. The detent 143, and in fact the entire detent arm 140, the driver adjustment plate 146, and the driver 130, are urged vertically upwardly by a compression spring 151 which is confined between the detent arm flange 141 and the upper portion of the casing section 124. Under the pressure of the spring, the detent 143 is maintained in contact with the under surface of the detent plate. When one of the smaller recesses 88 is in vertical alignment with the detent, the detent cannot enter the notch and so the detent plate retains the detent arm 140, the driver adjustment plate 146, and the driver 130 in their lowered position illustrated in Figures 6 and 7. When one of the larger recesses 87 of the detent plate is aligned with the detent 143, the detent 143, the detent arm 140, the driver adjustment plate 146, and the driver 130 are urged upwardly by the spring 151 to that position illustrated in Figure 9 of the drawings.

It will be readily appreciated that rotation of the detent plate to selectively bring either the larger notches 87 or the smaller notches 88 into registry with the detent 143 may be accomplished by manual actuation of the Bowden cable 77 to move the detent plate actuator finger 81, by means of the primary valve plate 70, so that the detent plate 86 is indexed in a counterclockwise direction as shown in Figure 1 or a clockwise direction as shown in Figure 3. The design of the detent plate actuator finger 81 is such that it acts to move the detent plate 86 only upon movement of the Bowden cable to the right as shown in Figure 3 or to the left as shown in Figure 1.

The result of vertical movement of the detent arm and the driver is well illustrated by a comparison of Figures 6 and 7 of the drawings with Figure 9 of the drawings. In Figures 6 and 7, it will be seen that the driver 130 is positioned radially of the shaft 17 so that the projection 132 is located relative to the wings 122 and 123 which are displaced axially of the shaft 17 to an extent sufficient to bring them into radial registry with the driver. Inasmuch as the driver is rotatable with the shaft 17 and, therefore, with the vane 14, movement of the vane will cause movement of the driver until the portion 132 of the driver contacts the adjacent edge of the cam projection 124. Continued movement of the driver will move the cam in a clockwise direction as illustrated in Figures 6 and 7, until the cam is moved radially to the extent at which the crown of each of the cam projections 124, 125 contacts the cam portions 103, 104 of the rocker arms 100, 101, respectively, and the rocker arms are spread laterally, i. e., radially of the shaft 17, against the action of the compression spring 107. When the rocker arms are spread in this manner, continued movement of the driver will rock the cam over center so that the cam portions 103, 104 then ride down the inclined cam surfaces presented by the cam projections 124, 125 which are in contact with the rocker arm cam portions 103, 104. At this point, the compression of the spring 107 will force the cam beyond its over center position and into contact with the wedge-shaped portion 113 of the shuttle valve actuator 110.

The shuttle valve actuator is concentric with the shaft 17 and it is freely rockable thereon, so that movement of the vane does not affect movement of the shuttle valve. However, movement of the cam projections 124, 125 into contact with the shuttle valve will force the shuttle valve to oscillate from its position shown in Figure 6 at which the ports 54 and 55 are connected by the shuttle valve 115 to a position at which the ports 55 and 56 are connected by the shuttle valve 115. This shifting of the shuttle valve will cause reversal in the direction of travel of the vane 14, inasmuch as one side of the vane has been disconnected from vacuum and the other side of the vane has been connected with the vacuum because of the arrangement of the ports 54, 55, and 56. The uncovered port 54 or 55 will be subjected to atmospheric pressure within the chamber 26.

The point of actuation of the shuttle valve and the point at which reversal of the direction of movement of the vane 14 occurs is dependent upon the extent of radial movement of the shuttle valve actuator which is necessary to move the cam 121 to its position illustrated in Figure 7 and therebeyond.

To vary the stroke of the vane 14, thereby varying the frequency of operation of the motor, it is only necessary to actuate the detent plate through the detent plate actuator, the primary valve plate 70 and the Bowden cable 77 to move one of the larger notches 87 over the detent 143. This movement allows the spring 151 to expand, elevating the detent arm and the driver, so that the arcuate portion 133 of the driver is aligned with the cam plates 122, 123. When this position is assumed, as illustrated in Figure 9 of the drawings, it will be obvious that less movement of the vane 14, and accordingly, less rotative movement of the shaft 17 will be necessary to move the cam relative to the rocker arms to a point at which the rocker arm spring 107 pressure will move the shuttle valve to its adjusted position. In the event of such adjustment, as shown in Figure 9, the stroke of the motor will be shortened and the frequency of motor operation will be increased. As shown in the drawings, the vane is operated in the central part of its path of movement. Obviously, the arcuate portion 133 of the driver can be lengthened or foreshortened on one side or the other to vary the wipe pattern of the system.

Thus, the present invention provides a new and novel adjusting mechanism whereby the position of the shuttle valve actuating mechanism can be adjusted manually in order to vary the frequency, and also the stroke distance, of a fluid actuated motor. More specifically, the detent mechanism comprising the plate 86, the detent 143, and the detent arm 140 is effective to move the driver 130 in a direction different from the normal driving direction of the driver so as to change the point of actuation of the shuttle valve. In other words, the point of actuation of the shuttle valve is varied relative to the displacement of the fluid motor piston, thereby varying both the stroke and frequency of operation of the motor. The novel detent actuating mechanism makes possible the adjustment of the motor by using a single manual adjustment which also controls the primary valve or the "off" and "on" valve of the motor. The detent inter-connection between the primary valve assembly and the shuttle valve assembly makes possible this new and novel operation. The advantage of this novel operation resides in the utility of a single motor control to both connect and disconnect the motor from a source of fluid pressure different from atmospheric pressure and also to control the rate and extent of motor operation.

It will, of course, be understood that various details of construction may be varied through a wide range without departing from the principles of this invention, and it is, therefore, not the purpose to limit the patent granted hereon otherwise than necessitated by the scope of the appended claims.

I claim:

1. In a reciprocating fluid motor having a displaceable element disposed in a casing, a primary valve movable from an "off" position to an "on" position for admitting to the motor fluid at a pressure higher than the pressure at which such fluid is discharged from the motor, manually movable actuating means for moving said primary valve, a shuttle valve movable between first and second positions to direct fluid from said primary valve to the opposite sides, respectively, of said displaceable element to displace the same, driving means actuated by said displaceable element for moving said shuttle valve to its first and second positions, said driving means being additionally movable to a plurality of positions to vary the point of actuation of said shuttle valve from one of its positions to the other relative to the position of said displaceable element, and interconnecting means joining said manual actuating means and said driving means to vary the point of actuation of said shuttle valve upon successive movements of said actuating means.

2. In a reciprocating fluid motor having a displaceable element disposed for relative movement in a casing, an off-and-on valve manually movable to and from a position at which fluid is admitted to the motor at a pressure higher than the pressure at which such fluid is discharged from the motor, a shuttle valve movable to a pair of positions to admit fluid to the opposite sides, respectively, of the displaceable element for displacing the same, a driver operatively connected to said displaceable element for movement therewith and operatively engageable with said shuttle valve to move the shuttle valve from one of its positions to the other, said driver being shiftable with respect to shuttle valve to vary the degree of displacement of said element necessary to move the shuttle valve, and a driver adjustment mechanism operatively connecting said driver to said off-and-on valve, so that successive manual movement of said off-and-on valve to and from its said position will vary the displacement of said displaceable element necessary to move the shuttle valve.

3. In a reciprocating fluid motor having a vane arcuately movable in a casing, a manually adjustable primary valve for admitting to the motor fluid at a pressure higher than the pressure at which such fluid is discharged from the motor, and a shuttle valve movable to admit fluid to one or the other side of said vane to actuate the same, the improvements which comprise a driver arcuately movable with said vane and operatively connected to said shuttle valve to move the shuttle valve, said driver also being movable relative to the vane to vary the position of the driver relative to the shuttle valve, thus varying the stroke of the vane, and an actuating arm operatively interconnecting said primary valve and said driver to move the driver relative to said vane upon manual adjustment of the primary valve, thereby varying the stroke of the vane.

4. A reciprocating motor for use with a source of fluid pressure differing from atmospheric pressure and having a piston movable in a casing when subjected to differential fluid pressures and comprising a first manually operable valve means for admitting to the motor fluid pressure from said source, a second piston operable valve means interposed between said first valve means and said casing, said second valve means being actuatable upon piston movement for actuation from one position connecting one side of said piston to said source, to a second position connecting the other side of said piston to said source, and means interconnecting said valve means and movable upon manual operation of said first valve means to vary the degree of movement of said piston necessary to actuate said second valve.

5. In a motor having a casing and a piston dividing the casing into two compartments, said piston being oscillatable in the casing upon subjection of the piston to differential fluid pressures vented to said compartments on opposing sides of the piston, a shut-off valve movable between a pair of positions at which the motor is alternatively excluded from or vented to said differential pressures, manual means for actuating said shut-off valve to its pair of positions, a shuttle valve operatively interposed between the shut-off valve and the casing compartments to alternately subject opposite sides of said piston to the differential pressures, lost-motion connection means operatively connecting said piston and said shuttle valve to actuate the shuttle valve upon movement of said piston to a predetermined position and including means for varying the degree of lost-motion in said connection means to thereby vary the predetermined position of said piston at which said shuttle valve is actuated, and a detent mechanism joining said last-named means and said manual means for actuating said shut-off valve, whereby successive manual actuations of said shut-off valve will vary the degree of lost-motion in said connection means.

6. In a vacuum windshield wiper motor having a casing, a vane oscillatable in the casing, a manually movable primary valve interposed between a source of vacuum and the motor and a shuttle valve interposed between the primary valve and the vane to alternately subject opposite sides of the vane to vacuum, the improvements of a driver for connecting the vane to the shuttle valve and having shuttle valve actuating portions of different dimensions to vary the stroke of the vane necessary to actuate the shuttle valve, and means for shifting the driver, including cooperating detent elements, one of said elements being movable with the primary valve and another of said elements being operatively connected to the driver.

7. In a vacuum windshield wiper motor having a casing, a vane oscillatable in the casing, a manually movable primary valve interposed between a source of vacuum and the motor, and a shuttle valve interposed between the primary valve and the vane to alternately subject opposite sides of the vane to vacuum, the improvements which comprise means for operatively connecting the vane to the shuttle valve including a driver drivingly connected to the vane, the driver having a first portion for actuating the shuttle valve upon movement of the vane to a first predetermined position and a second portion for actuating the shuttle valve upon movement of the vane to a second predetermined position, and means operative in response to manual movement of said primary valve for shifting the driver to bring either of said portions thereof into actuating relation with said shuttle valve.

8. In a reciprocating fluid motor having a displaceable vane disposed in a casing for arcuate movement about a fixed axis, a primary valve movable from an "off" position to an "on" position for admitting to the motor fluid at a pressure higher than the pressure at which such fluid is discharged from the motor, manually movable actuating means for moving said primary valve, a shuttle valve movable about said fixed axis between first and second positions to direct fluid from said primary valve to the opposite sides, respectively, of said displaceable element for moving said shuttle valve to its first and second positions, said driving means being movable relative to said axis to a plurality of positions to vary the point of actuation of said shuttle valve relative to the position of said displaceable element, thereby varying the stroke of said displaceable element, and an actuating arm joining said manual actuating means to said driving means and shiftable upon actuation of the primary valve to move the driving means relative to said axis for shifting the point of actuation of said shuttle valve upon successive movements of said actuating means.

9. A reciprocating motor for use with a source of fluid pressure differing from atmospheric pressure and having a piston movable in a casing when subjected to differential fluid pressures and comprising a first valve means adapted for manual operation to admit to the motor fluid pressure from said source, manual means for operating said first valve means, a second valve means interposed between said first valve means and said casing, said second valve means being actuatable in response to piston movement and said second valve means being movable from one position connecting one side of said piston to said source to a second position connecting the other side of said piston to said source, and a detent mechanism including arm and plate elements, one of said elements being connected to said manual means and the other being operatively connected to said second valve, said elements being actuated upon manual operation of said first valve means to change the relationship of said second valve means to said piston so that the degree of movement of said piston necessary to actuate said second valve is changed.

10. A motor comprising a casing and a piston dividing the casing into two compartments, said piston being oscillatable about a fixed axis in the casing upon subjection of the piston to differential fluid pressures vented to said compartments on opposing sides of the piston, a shut-off valve movable between a pair of positions at which the motor is alternatively excluded from or vented to said differential pressures, manual means for actuating said shut-off valve to its pair of positions, a shuttle valve operatively interposed between the shut-off valve and the casing compartments to alternately subject opposite sides of said piston to the differential pressures, lost-motion connection means operatively connecting said piston and said shuttle valve upon movement of said piston to a predetermined position, said lost-motion connection means including an element driven by said piston for oscillatory movement therewith about said fixed axis, said element having radially spaced shuttle valve actuating portions of different circumferential extent for effecting actuation of the shuttle valve at different oscillated positions of said piston, and means interconnecting said element and said manual means for radially shifting said element upon each successive manual actuation of said shut-off valve for bringing said radially spaced element portions into operative relation with said shuttle valve.

11. In a vacuum windshield wiper motor having a casing, a vane oscillatable in the casing, a manually movable primary valve interposed between a source of vacuum and the motor, and a shuttle valve interposed between the primary valve and the vane to alternately subject opposite sides of the vane to vacuum, the improvements of a driver driven by the vane for oscillation therewith and operatively connecting the vane to the shuttle valve and having separate shuttle valve actuating portions of different dimensions to vary the stroke of the vane necessary to actuate the shuttle valve, said actuating portions being aligned in a plane transverse to the plane of oscillation of said driver, and means for shifting the driver, a single actuating mechanism for operating both said primary valve and said driver, successive operations of said primary valve shifting said driver in said transverse plane to bring different actuating portions of said driver into operative relation with said shuttle valve, said mechanism including cooperating detent elements, one of said elements being movable with the primary valve and another of said elements being operatively connected to the driver.

12. In a vacuum windshield wiper motor having a casing, a vane oscillatable in the casing, a manually movable primary valve interposed between a source of vacuum and the motor for alternately interrupting and establishing communication between said motor and said source, and a shuttle valve interposed between the primary valve and the vane to alternately subject opposite sides of the vane to vacuum, the improvements which comprise means for operatively connecting the vane to the shuttle valve including a driver operatively connected to the vane for oscillatory movement therewith, the driver having a first portion for actuating the shuttle valve upon movement of the vane to a first predetermined position and a second portion for actuating the shuttle valve upon movement of the vane to a second predetermined position, and means operative in response to successive manual movements of said primary valve for alternately shifting the driver in a direction different from its direction of oscillatory movement to bring first one and then the other of said portions thereof into actuating relation with said shuttle valve.

13. In a vacuum windshield wiper motor having a casing, a vane oscillatable in the casing, a movable primary valve interposed between a source of vacuum and the motor, and a shuttle valve interposed between the primary valve and the vane to alternately subject opposite sides of the vane to vacuum, the improvements which comprise means for operatively connecting the vane to the shuttle valve including a driver drivingly connected to the vane, the driver having a first portion for actuating the shuttle valve upon movement of the vane to a first predetermined position and a second portion for actuating the shuttle valve upon movement of the vane to a second predetermined position, manual means for operating said primary valve, and means responsive to said manual means for shifting the driver to bring either of said portions thereof into actuating relation with said shuttle valve.

No references cited.